United States Patent [19]

Leweringhaus et al.

[11] Patent Number: 5,236,485
[45] Date of Patent: Aug. 17, 1993

[54] PROCESS AND DEVICE FOR SHAPING A GOB

[75] Inventors: Manfred Leweringhaus, Holteregge 36, D-4322 Sprockhovel, Fed. Rep. of Germany; Laszlo Benke, Glattburgg, Switzerland; Ottfried Kemp, Sprockhovel, Fed. Rep. of Germany

[73] Assignee: Manfred Leweringhause, Sprockhovel, Fed. Rep. of Germany

[21] Appl. No.: 871,563

[22] Filed: Apr. 17, 1992

Related U.S. Application Data

[63] Continuation of Ser. No. 347,898, Aug. 23, 1990, filed as PCT/EP87/00554, Sep. 29, 1987, abandoned.

[30] Foreign Application Priority Data

Sep. 30, 1986 [DE] Fed. Rep. of Germany ....... 3633137

[51] Int. Cl.$^5$ ............................................. C03B 11/16
[52] U.S. Cl. ........................................... 65/29; 65/82; 65/102; 65/161; 65/314; 65/362
[58] Field of Search ................ 65/82, 102, 29, 160, 65/161, 314, 362

[56] References Cited

U.S. PATENT DOCUMENTS

| | | | |
|---|---|---|---|
| 3,337,325 | 8/1967 | Bittner et al. | 65/314 |
| 3,634,060 | 1/1972 | Dahlman | 65/362 X |
| 4,662,923 | 5/1987 | Vajda et al. | 65/160 X |
| 4,723,976 | 2/1988 | Shanaberger | 65/160 X |
| 4,867,778 | 9/1989 | Pinkerton | 65/160 X |

FOREIGN PATENT DOCUMENTS 0165012 6/1985 European Pat. Off. .

Primary Examiner—Robert L. Lindsay, Jr.
Attorney, Agent, or Firm—Tarolli, Sundheim & Covell

[57] ABSTRACT

In a process for shaping a gob in order to obtain a hollow glass article by means of an electronically-regulated and hydraulically-propelled level, the process of shaping the gob into a rough or finished product is rationally effected in a predefinable and in particular precisely reproducible manner by the fact that an electro-hydraulic servo-drive is sued as a means for driving the level, and that the latter, during at least the practically total performance of the movement, is adjusted in position by means of a closed position-regulating circuit. In a device suited for this purpose the drive device of the level consists of an electro-hydraulic servo-drive and an electronic position-adjusting device for the at least approximately total movement of the level. Preferably the movement of the level in the glass article is also effected at a regulated speed and, ideally, the shaping stage is completed by a pressure-regulated forward movement of the level.

13 Claims, 4 Drawing Sheets

Fig.4
Fig.5
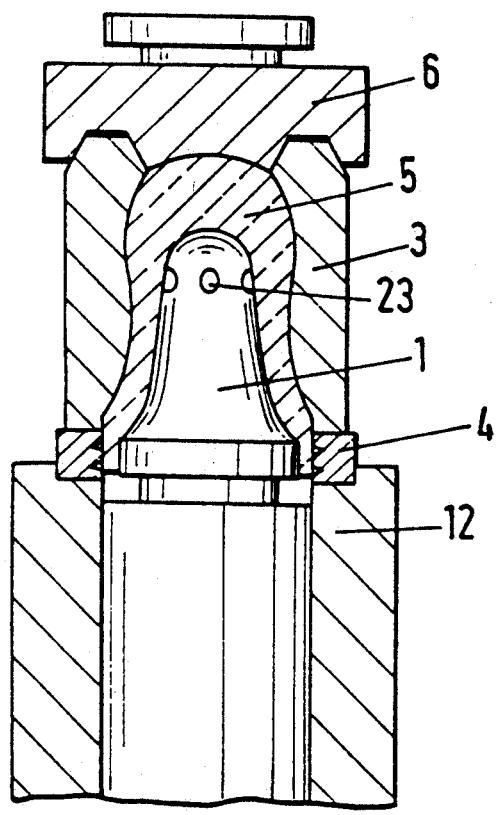
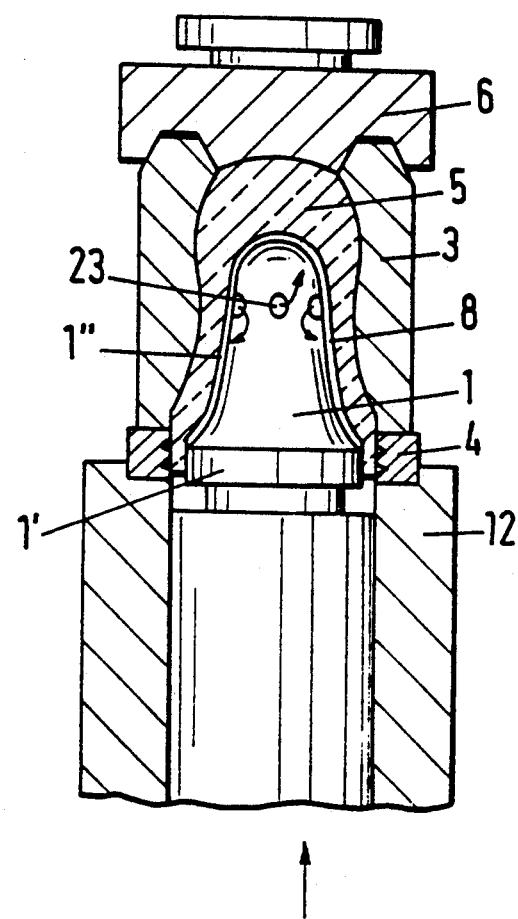

PROCESS AND DEVICE FOR SHAPING A GOB

This is a continuation of copending application Ser. No. 07/347,898, filed on Aug. 23, 1990, filed as PCT/EP87/00554, Sep. 29, 1987, now abandoned.

BACKGROUND OF THE INVENTION

1. Technical Field

The invention relates to an apparatus and a process for the shaping of a glass piece, especially in a closed-forming system, into a hollow glass article and namely, to a rough or final product, especially by means of producing machines working by the series principle, such as IS and RIS and other glass-working machines by means of a presettable plunger which can be driven into the glass piece. The plunger is movable from a loading position to a final pressing position, is speed regulated, and is also preferably pressure regulated.

2. Background Art

Machines for the production of hollow glass articles, such as the so-called IS and RIS machines working as series machines are known. In these known machines, the production process takes place at several production stations arranged one after the other. At each production station, the same production step takes place on one or on a plurality of pieces of glass. Therefore, the work cycles on the different pieces of glass are displaced in time. For the production of a hollow glass article, liquid drops of glass are pressed, or blown into a meal pre-mold to form a rough product, the so-called blank. After transferring this blank to the finish mold assigned to the pre-mold, the blank is formed in the finish mold into the finished product by blowing out or evacuating.

The drop of glass falls from above into the glass pre-mold closed at the side to the lower opening of which is connected a mouth tool. The drop falls on a plunger which is positioned in a loading position and which is variable in its height position. A bottom of the mold then closes the upper part of the mold. By means of a piston in a piston-cylinder arrangement, the plunger can be moved vertically up and down. After the closing of the pre-mold with the bottom of the pre-mold, the plunger through an upward movement presses the glass against the forming contour of the pre-mold and also against the contour of the mouth tool and the bottom of the pre-mold to give the glass the desired inner and outer contour at the same time. The liquid glass is limited therefore, for a short period of time at its total inner and outer surface by contours defined by the mold, and completely fills the free volume of the mold. When the liquid glass drop falls into the pre-mold, the plunger is in its loading position at which is closes the mouth opening of the mold in part. Only for the molding of the liquid glass is the level struck into the glass, and as a rule produces at the same time the mouth of the hollow glass article.

In this known glass-forming apparatus and process, the level, known in the art in the past and still today as a "plunger", is moved forward and backward pneumatically. Here, the loading position, as the lower outlet position for the present hollow glass article, can only be sufficiently positioned and changed with very great loss of time by means of distancing bushings or so-called "loading screws". Another disadvantage is the need of regulating the pneumatic pressure for each individual plunger. This pneumatic pressure must be so dimensioned that the mouth of the blank is completely formed. The pneumatic pressure may lie between about 0.4 and 1.5 bar, and must be empirically determined from quality control of the finished hollow glass article for each individual plunger. Changes in property value of the liquid glass might also lead to changes in quality. This necessitates another change of the pneumatic pressure.

However, with the known process and apparatus, the cycle of forming cannot be changed independently of other influencing factors. Instead, the pressure for advancing the plunger, the forming speed, and the static pressure on the glass and the mold system depend directly on the time axis and can only be changed slightly in part or not at all.

From EPO 165 012 A1 are known a process and an apparatus of the kind mentioned. Here the plunger is moved hydraulically according to a set time frame, whereby at given times, the speed course for the plunger can be preset. For the purpose, the computer is continually fed with external time pulses. A Hall sensor with a piston rod designed in screw form on its outer surface is used as a position sensor, and a pressure sensor is used to indicate the fluid pressure existing against the plunger. Through a computer arranged after these two sensors, the amounts of pressure and the supply of the hydraulic fluid moving the plunger can be varied according to the ratio between actual and desired values. This process has the disadvantage in that only a time frame for the individual flow phases is taken into consideration, whereas the continued position pattern of the plunger will not be taken into consideration so that the speed errors lead to unpredictable final positions of the plunger. It has been recognized that in this way, a sag in uniformity of product quality can result. It was further learned that in this known process, the plunger provided only speed measurements. The pressure was taken into consideration in this process, however, regulation of the pressure level in relation to time set in when the highest pressure position of the plunger is reached, that is, when the pressure between the plunger and the piece of glass stops movement of the plunger. It has been found especially harmful to the quality of the glass when the pressure against the plunger, as proposed there, is increased still more after reaching the stopped position of the plunger. The pressure regulation dependent on time is also a disadvantage, however, if it has been carried out during the forming step. Namely, it has been found that only when taking into account of the particular position of the plunger does a pressure change lead to the desired quality improvement or improvement of the uniformity of the quality of the glass article, while a pressure variation dependent on time very easily leads even to a worsening of quality or at least to a higher rate of rejects.

SUMMARY OF THE INVENTION

With this premise, the invention provides an apparatus and a process for the forming of a piece of glass. The invention does not have the above-mentioned disadvantages and should give entirely new possibilities for the forming of glass. In particular, it should be possible in the forming of a piece of glass to prescribe accurately the forming cycle for the rough product and the finished product, and in particular, to reproduce exactly. In particular, in the forming of a glass piece to a rough or finished product, the forming cycle should be carried out, according to the quality requirements and the values of the operating parameters of the glass piece itself as well as the mold, with the least reject waste at higher stroke speeds.

This problem is solved in the apparatus and process according to the invention recited in the claims of the present application. In one embodiment of the present invention, an electro-hydraulic servo drive is used for driving the plunger. The servo-drive includes special hydraulic cylinders which act as regulating and drive elements for the vertical up and down motion of the plunger. The servo-drive further includes an electronic position-regulating device.

Through the invention, among other things the quality of the product is uniform and improved. In particular, waste is diminished and the set-up time for the individual plungers is noticeably shortened. The subject of the invention may be applied in various common glass forming processes, such as the blow-blow process, the press-blow process, the press-blow-narrow neck, and the solid-blank process. The plunger mechanism may be installed directly at production stations already present, that is, existing machines may be re-equipped.

An "electro-hydraulic power drive", according to the invention, is understood as the following. A piston-cylinder arrangement is used for moving the plunger forward and backward. The piston can be moved forward and backward, as well as held in place, by hydraulic fluid. To obtain an exact prescribed movement forward and backward of the piston, a valve is used to supply and take away hydraulic fluid in prescribed amounts and speeds at the two ends of the piston. The valve is actuated electrically. Between the zero position of the valve and the maximum open position, all intermediate positions for the advance and retraction of the plunger are possible. Normally, the valve is characterized with very fine oscillation movements to assure the best possible accuracy of regulation. In this way, the hydraulically driven piston can be moved and positioned with great precision.

An "electronic position-regulating device", according to the invention, is understood as follows. The distance covered by the plunger during one forming cycle is divided into partial steps which are determined by very definite, preferably preset positions of the plunger in relation to the cylinder. For example, the preset positions include not only loading position, end position, and pull-back position, but also intermediate positions in which the advance characteristic of the plunger is changed. These positions are taken and held by the plunger, or released again, through a closed regulating circuit. For this, the position of the plunger through its whole cycle of movement is taken constantly by measurement and is preferably provided as an electrical signal fed to an evaluating unit such as a microprocessor. The actual position is compared with the desired position, and is forwarded on command to the electro-hydraulic power drive.

According to the invention, the plunger, at least from the loading position of the glass piece to the end position of the plunger or to a predetermined position before the final pressing position of the plunger, may be run at a regulated speed which may be predetermined. This speed-regulated movement step of the plunger is overlaid by the position regulation, that is, the speeds which can be preset between the positions of the plunger which can be preset can be kept adjustable. This is possible with the use of the above-mentioned actual position measurement with the use of a suitable microprocessor which is programmed with desired speed data, and which also contains the regulation of position. Through the linking of the speed regulation circuit with the closed position regulating circuit, the speed regulating circuit is also a closed regulating circuit.

According to a preferred embodiment of the invention, the plunger is run pressure regulated toward the end of the forming step carried out between the loading position and the end pressing position. This pressure-regulated work step may either be connected seamlessly to the position-regulated step and the speed-regulated step, or overlaid by the combined position-regulated and speed-regulated step, wholly or in part. The plunger positions at which the pressure regulation begins and, if desired, the other positions up to which the pressure regulation is overlaid by the speed-regulation and position regulation, may be preset through the position regulating circuit. In any case, it should be position-regulated up into the final pressing position. The pressure regulation circuit requires at least one pressure sensor which forwards the actual pressure value, for example, to the microprocessor where it is compared with the desired pressure value. Consequently, the microprocessor causes the valve used for this purpose to supply the hydraulic fluid for the desired pressure. Preferably, a pressure and amount-regulating valve which is a basic part of the power drive mentioned above is used.

Suitable developments of the subject of the invention which assure in particular, in advantageous cycle of movement, a simple handling of the plunger mechanism, and an improved quality of product, are contained in the further claims.

The parts or process steps to be used according to the invention are not subject, in their size, shape, choice of material and technical concept or their processing conditions, to any special exceptional conditions. This is so that the criteria of choice in the particular field of use may be used without limitation.

BRIEF DESCRIPTION OF THE DRAWINGS

Other details, features, and advantages of the subject of the invention are given in the description which follows of the respective drawings, in which one preferred embodiment of a glass forming device according to the invention has been represented. In the drawings:

FIG. 4 shows the same pre-mold with plunger mechanism, with glass blank formed, in the final pressing position of the plunger;

FIG. 5 shows the same pre-mold with the plunger mechanism in the cooling position of the plunger;

DESCRIPTION OF A PREFERRED EMBODIMENT

Figure 1:
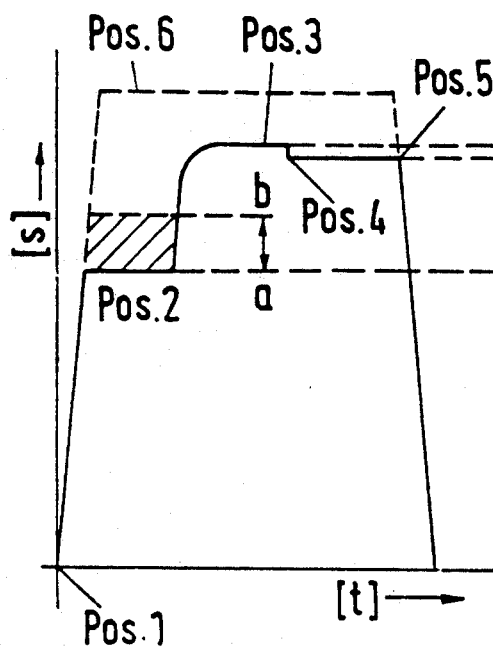
FIG. 1 shows a travel distance-time diagram of the plunger movement during one work cycle.
Figure 6:
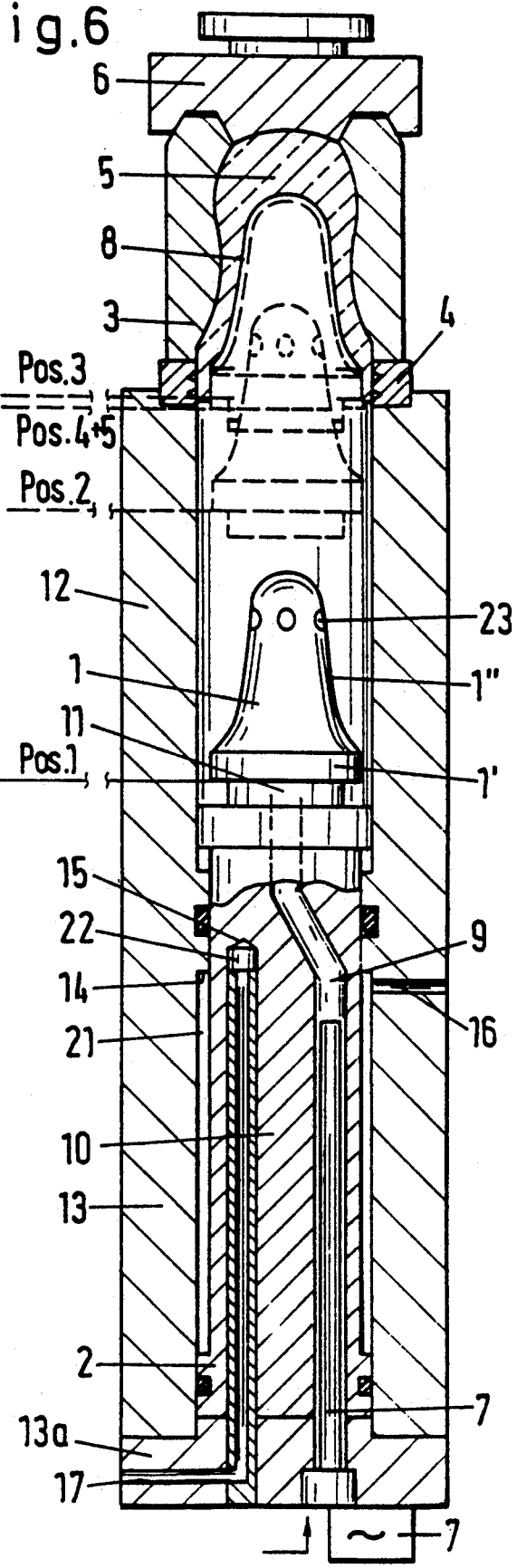
FIG. 6 shows the same pre-mold, with complete plunger mechanism in the lower final position of the plunger.
Figure 2:
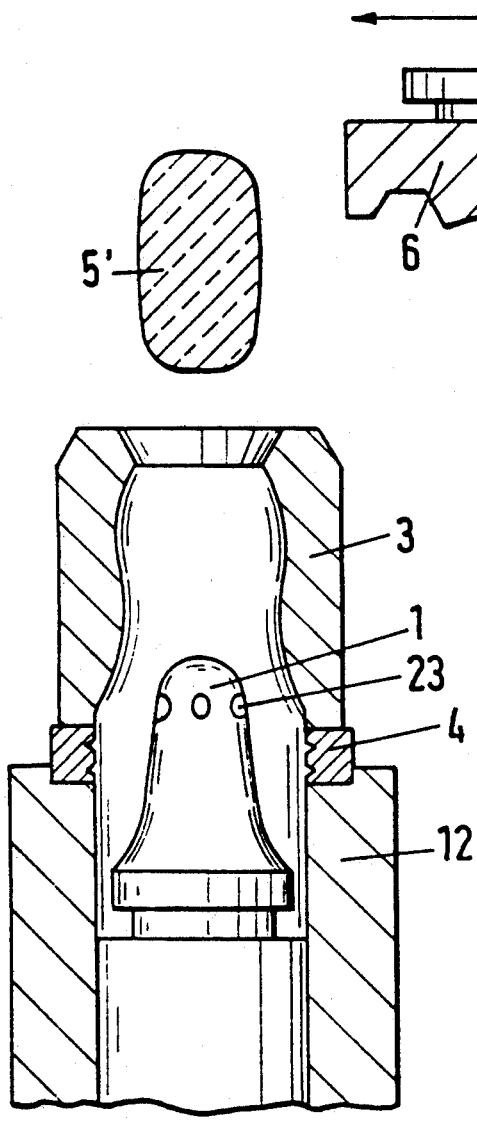
FIG. 2 shows a pre-mold with plunger mechanism in vertical section and in the loading position with molten glass.
Figure 3:
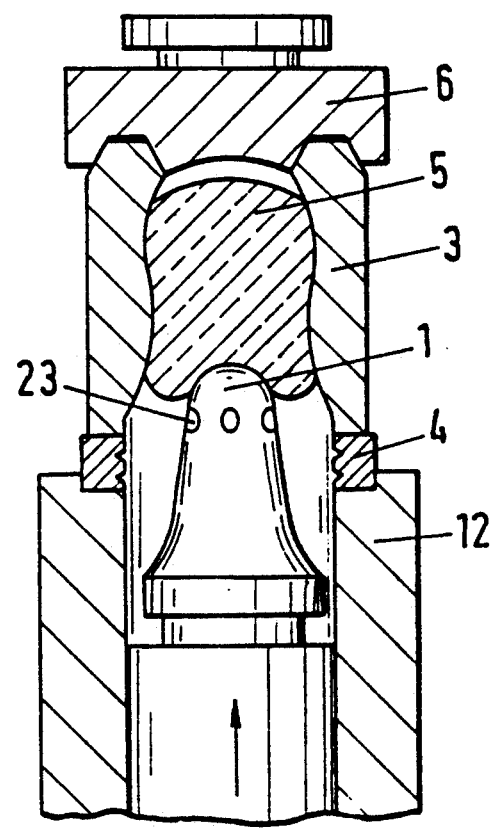
FIG. 3 shows the same pre-mold with plunger mechanism, with pre-mold already loaded and closed, in the loading position of the plunger.
Figure 7:
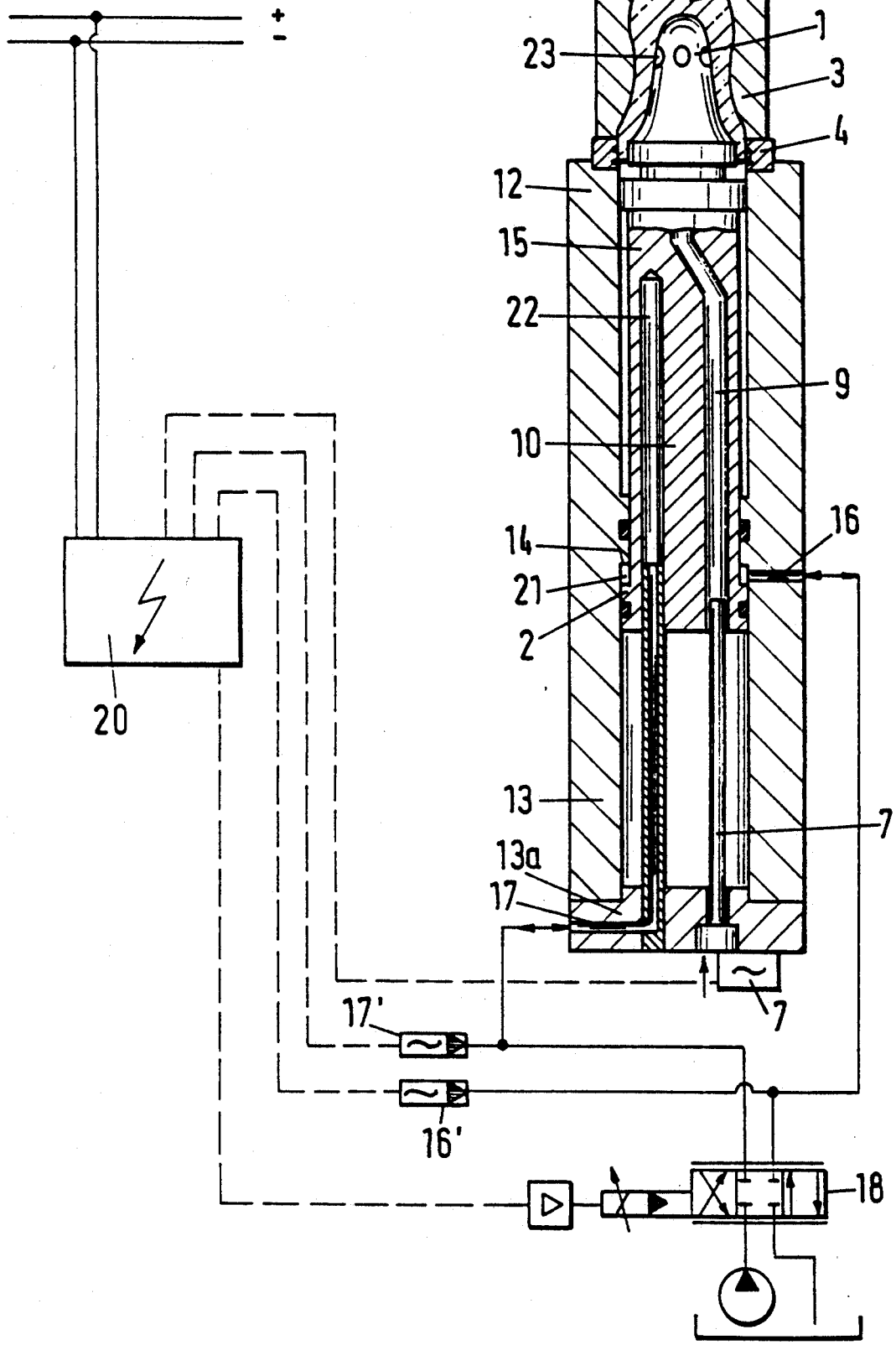
FIG. 7 shows the same pre-mold with complete plunger mechanism and regulating elements in the final pressing position of the plunger.

According to FIGS. 1, 6 and 7, a plunger 1 hollow inside and having cooling or compressed air passages is fastened, e.g., screwed at the end 11 to a piston rod 10 through which air can pass. The piston rod 10 bears a piston 2 which can be pushed along axially with ease in a cylinder housing 13, and which is connected fluid-tight through an end wall 14 of the cylinder 13. Through bores 16 and 17, hydraulic fluid can flow into and out of the chambers 21 and 22 for the advance and retraction of the piston 2.

The plunger 1 is protected over a large part of its total stroke of about 180 mm by a housing 12 extending in continuation of the cylinder housing 13 having an open end for the passage of the plunger 1.

At the lower end position (Pos. 1) of the plunger 1 or the piston 2, the piston lies against a lower mechanical stop 13a of the cylinder housing 13. At the beginning of a work cycle, a microprocessor 20 (FIG. 7) provides to an electro-hydraulic power valve 18, known per se, an outer starting signal by which a movement of the plunger 1 into a load or charging position (Pos. 2) begins at a speed which can be controlled or regulated, especially a maximum speed. This charging position may be adjusted continuously in both directions (directions "a" and "b" in FIG. 1). In the distance-time diagram of FIG. 1, this cycle movements is represented on a larger scale as linear. But actually, the acceleration and braking process leads, for example, to a sinus or exponential course which may be preset of the distance-time curve. During this movement cycle, the actual position of the plunger 1 is continuously monitored and reported back to the microprocessor 20 by a position sensor 7 known per se, especially one arranged with in an air feed pipe to the plunger 1. Based on a desired-actual comparator, the microprocessor gives the power valve 18 a suitable signal through which the movement of the plunger 1, position-regulated and preferably also speed-regulated, into the charging position (Pos. 2) is made possible. In this way, an exactly reproducible finding of the charging position is allowed. In principle, the work cycle may also be started or stopped in any other position such as an intermediate or the charging position.

In the charging position (Pos. 2), the plunger 1 closes the pre-mold consisting of the side parts of the mold 3, a neck forming tool 4, and the bottom 6 of the mold, only in part, and forms in the neck zone of the pre-mold a ring gap. A glass piece, consisting of a dropping of glass 5', introduced by falling into the mold per work cycle, is pre-molded by the further movement of the plunger 1. Just before this, or at the same time, the pre-mold is the mold and is closed by the mold bottom 6.

The forming step is introduced again by a suitable external start signal from the microprocessor 20 to the power valve 18. The desired speeds of movement of the plunger 1 in the forming step are fed into the microprocessor 20. In particular, any desired distance-time profile may be programmed, for example, sinus form or exponential. This regulated penetration speed may also be linear. Preferably, it changes toward the end of the forming step, toward lower speeds, and amounts to zero when the so-called final pressing position (Pos. 3) is reached, that is, when the glass piece 5 has been finished. The exact maintenance of the prescribed speeds will be assured by a combined position and speed regulation circuit of the microprocessor 20.

Toward the end of the forming step, the position and speed regulating of the plunger 1 is preferably automatically converted into a pressure regulation with the use of a pressure measuring sensor 16' and 17'. Preferably, the pressure regulation overlays the position and speed regulation until it finally dominates. With this, the plunger moves farther into the piece of glass 5 until the counter-pressure on the plunger 1 through the forming of the piece of glass has reached the pressure fed in by the microprocessor 20. In this way, the position of the plunger 1 can be regulated exactly during its whole cycle of movement, and therefore very exactly known. In this way, for the first time, it is possible to take into account the property values of the piece of glass, the change of these property values during the forming process, and/or the changing of molds and tools because of wear, for example.

When the equilibrium is established between the prescribed final pressing pressure of the plunger and the counter-pressure of the piece of glass, the ideal forming of the glass has taken place and the plunger 1 has reached the final pressing position (Pos. 3). With this, a further pressing forward of the plunger 1 is prevented, and the transmission of a higher static pressure from the plunger 1 to the glass and the mold system is prevented.

After reaching the final pressing position (Pos. 3), the glass piece is finished. Its neck zone is, as a rule, already completely finished, that is, as provided for the hollow glass article. From this final pressing position, the plunger 1 is at first slightly retracted so that between the glass and the plunger a cooling air gap 8 results. In this cooling position (Pos. 4), the plunger is drawn back between 0.5 and 1.5 mm from the end pressing position (Pos. 3). A part of its cylindrical zone 1' is still in the zone of the neck forming tool 4 so that the neck zone of the glass is protected during the reheating process which is already beginning again. The conical zone 1" of the plunger 1 has then already loosened from the pre-pressed glass 5. The reheating of the part of the glass still to be formed can now begin. Damage to the inner surface of the glass, especially by the plunger, is reduced to a minimum.

After reheating and reaching neck stability (Pos. 5), the plunger is retracted, through a corresponding signal, into the starting position.

In empty run of a production station, that is, when the pre-mold is not loaded with a piece of glass, the plunger goes back into an upper end position (Pos. 6) of the piston 2 in which it stops at the distance position given to the microprocessor and from which it is retracted again into the starting position through a corresponding external signal.

The piston rod 10 bearing the plunger 1 is provided with an axial passage bore 9 through which the cooling air is fed to the plunger 1. Preferably, the passage bore 9 also receives the position sensor 7 acting as an absolute distance measurement sensor arranged in an air feed tube.

In the chamber or before the two chambers 21 and 22 formed by the cylinder housing 13 with the end walls 14 and 15, as well as the piston 2, are placed preferably in each case one or more hydro-electric analog pressure sensors 16' and 17', so that not only the hydraulic pressure, but also the actual force of the plunger 1 an be determined.

The pressure increase or decrease desired for the actuation of the piston 2 is obtained through the electro-hydraulic power valve 18. The power valve 18 is arranged against the outer wall of the cylinder housing 13 or outside, especially in a control plate in common with the pressure sensors 16' and 17', and is preferably designed so that the maximum pressure increase or decrease only takes place with a piston deflection of at least 1.5%. The freely selectable loading position (Pos. 2) as well as the final pressing position (Pos. 3), also freely selectable, may be held with a greater accuracy, for example ±0.1 or better. Also, the adjustable end pressure desired value of the plunger which, according to experience, lies between 200 and 600 Newtons per square centimeter is held with a greater accuracy of ±5 Newtons per square centimeter, for example. All actual distance values of the plunger are taken by the position sensor 7 and reported back to the microprocessor 20. Through the end position reached at the end of the forming step, and through the pressured parameters of the plunger, a conclusion may be drawn, if the volume of the mold is known, about the exact dropping weight of the glass piece.

It has been shown that a perfect distribution of the glass in the mold (even in the rather difficult press-blow process) and in the forming of the neck of the hollow glass article can be obtained by using a combined position, speed, and pressure regulation of the plunger in a closed regulating circuit.

As can be seen, therefore, this new kind of use of an electro-hydraulic power drive in the forming of a piece of glass leads to unexpected great advantages. The same applies to the new use of an electronic data processing unit, especially a microprocessor, for the regulation of the cycle of movement of a hydraulic power drive with the use of a distance, flow and/or pressure-measuring sensor.

Having described a preferred embodiment of the invention, we claim:

1. A process for forming a piece of glass into a hollow glass article by means of a plunger which can be hydraulically driven from a glass-loading position through at least one presettable position to a final glass-pressing position, the process comprising the steps of
moving the plunger from its position when the piece of glass is loaded,
position-regulating movement of the plunger independent of time by monitoring the actual position of the plunger during movement of the plunger and comparing the actual position of the plunger with a plurality of stored predetermined position values,
continuing movement of the plunger until the plunger moves into the presettable position before the final position, and
speed-regulating movement of the plunger by varying the speed of movement of the plunger depending upon the actual position of the plunger compared to the stored predetermined position values of the plunger.

2. A process for forming a piece of glass into a hollow glass article by means of a plunger which can be hydraulically driven from a glass-loading position through at least one preset position to a final glass-pressing position, the process comprising the steps of:
moving the plunger from its position when the piece of glass is loaded;
position-regulating movement of the plunger independent of any predetermined time duration as the plunger moves from its position when the piece of glass is loaded until the plunger reaches the preset position by (i) monitoring the actual position of the plunger during movement of the plunger, and (ii) comparing the actual position of the plunger with a plurality of stored position values;
regulating the speed of movement of the plunger at a presettable speed by changing the actual speed of movement of the plunger when the actual speed of the plunger is different from the preset speed of the plunger; and
changing the presettable speed of movement of the plunger including stopping movement of the plunger independent of any predetermined time duration only when the plunger reaches a preset position or the final glass-pressing position.

3. A process according to claim 2 with the distinction that the forming of the piece of glass includes the step of regulating the pressure of the plunger into the piece of glass independent of any predetermined time duration until the counter-pressure arising in the piece of glass has reached a preset pressure.

4. A process according to claim 3 with the distinction that the regulating steps are wholley or partly overlaid.

5. A process according to claim 4 with the distinction that the overlaying is gradual and is in such succession that speed regulation and then pressure regulation dominates.

6. A process according to claim 2 with the distinction that the position of the plunger attained upon reaching the preset position is maintained.

7. A process according to claim 1 with the distinction that the type of regulation is presettable.

8. A process according to claim 1 with the distinction that the plunger is movable at an adjustable speed from a lower end position (Pos. 1) to the loading position.

9. A process according to claim 1 with the distinction that the plunger, after reaching the final position, is slightly withdrawn to a cooling position (Pos. 4) so as to form a cooling gap between the plunger and the piece of glass formed into a blank.

10. A process according to claim 9 with the distinction that reheating of the blank begins while the plunger is in the cooling position.

11. A process according to claim 9 with the distinction that in the cooling position, a conical portion of the plunger is separated from the blank and the mouth portion of the blank is supported by a cylindrical portion of the plunger.

12. A process according to claim 1 with the distinction that the drop weight of the piece of glass is determined based on the final position reached by the plunger.

13. A device for forming a piece of glass into a hollow glass article, said device comprising:
a mold for receiving the piece of glass;
a plunger;
hydraulic means for driving said plunger into the piece of glass, said plunger being movable relative to said mold at least from a glass-loading position when the piece of glass is loaded into said mold through at least one preset position to a final glass-pressing position when said plunger presses the piece of glass;
means for position-regulating movement of said plunger independent of any predetermined time duration as the plunger moves from said glass-loading position to said final glass-pressing position by (i) monitoring the actual position of said plunger during movement of the plunger, and (ii) comparing the actual position of said plunger with a plurality of stored predetermined position values;

means for regulating the speed of movement of the plunger at a presettable speed by changing the actual speed of movement of the plunger when the actual speed of the plunger is different from the preset speed of the plunger; and means for changing the presettable speed of movement of the plunger including stopping movement of the plunger independent of any predetermined time duration only when the plunger reaches a preset position or the final glass-pressing position.

* * * * *

UNITED STATES PATENT AND TRADEMARK OFFICE
CERTIFICATE OF CORRECTION

PATENT NO. : 5,236,485
DATED : August 17, 1993
INVENTOR(S) : Manfred Leweringhaus, Laszlo Benke and Ottfried Kemp It is certified that error appears in the above-indentified patent and that said Letters Patent is hereby corrected as shown below:

Column 8, line 29, change "2" to --3--.

Column 8, line 32, change "1" to --2--.

Column 8, line 34, change "1" to --2--.

Column 8, line 37, change "1" to --2--.

Column 8, line 50, change "1" to --2--.

Signed and Sealed this

Twelfth Day of April, 1994

Attest:

BRUCE LEHMAN

Attesting Officer    Commissioner of Patents and Trademarks